(12) United States Patent
Feiste et al.

(10) Patent No.: US 6,349,382 B1
(45) Date of Patent: Feb. 19, 2002

(54) SYSTEM FOR STORE FORWARDING ASSIGNING LOAD AND STORE INSTRUCTIONS TO GROUPS AND REORDER QUEUES TO KEEP TRACK OF PROGRAM ORDER

(75) Inventors: Kurt Alan Feiste; Bruce Joseph Ronchetti; David James Shippy, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/263,665

(22) Filed: Mar. 5, 1999

(51) Int. Cl.[7] .............................................. G06F 15/00
(52) U.S. Cl. ..................... 712/216; 217/23; 217/220; 217/225
(58) Field of Search ........................ 712/23, 216, 220, 712/225

(56) References Cited

U.S. PATENT DOCUMENTS 5,664,215 A * 9/1997 Burgess et al. ................ 712/23
5,721,857 A * 2/1998 Glew et al. .................... 712/23
5,751,983 A * 5/1998 Abramson et al. .......... 712/216
5,778,245 A * 7/1998 Papworth et al. ............. 712/23
5,809,275 A * 9/1998 Lesartre ...................... 712/216
5,931,957 A * 8/1999 Konigsburg et al. .......... 714/48
6,021,485 A * 2/2000 Feiste et al. ................ 712/216

* cited by examiner

Primary Examiner—Zarni Maung
Assistant Examiner—Nabil El-Hady
(74) Attorney, Agent, or Firm—Kelly K. Kordzik; Winstead Sechrest & Minick P.C.; Anthony V. S. England

(57) ABSTRACT

In a load/store unit within a microprocessor, load and store instructions are executed out of order. The load and store instructions are assigned tags in a predetermined manner, and then assigned to load and store reorder queues for keeping track of the program order of the load and store instructions. When a load instruction is issued for execution, a determination is made whether the load instruction is attempting to load data to a memory location that is the same as a previously executed store instruction is waiting to complete. If so, then the data waiting to be stored within the cache by the store instruction is directly forwarded to the load instruction.

9 Claims, 5 Drawing Sheets

SYSTEM FOR STORE FORWARDING ASSIGNING LOAD AND STORE INSTRUCTIONS TO GROUPS AND REORDER QUEUES TO KEEP TRACK OF PROGRAM ORDER

CROSS REFERENCE TO RELATED APPLICATION

The present invention is related to the following patent applications:

U.S. patent application Ser. No. 09/213,331 now U.S. Pat. No. 6,301,654, issued Oct. 9, 2001 entitled "System and Method for Permitting Out-of-Order Execution of Load and Store Instructions";

U.S. patent application Ser. No. 09/259,140, entitled "System and Method for Executing Store Instructions", and U.S. patent application Ser. No. 09/259,139, entitled "System and Method for Merging Multiple Outstanding Load Miss Instructions," which are all hereby incorporated by reference herein.

TECHNICAL FIELD

The present invention relates in general to data processing systems, and in particular, to the execution of out-of-order load and store instructions in a processor.

BACKGROUND INFORMATION

In order to increase the operating speed of microprocessors, architectures have been designed and implemented that allow for the out-of-order execution of instructions within the microprocessor. An advantage of out-of-order execution of instructions is that it allows load miss latencies to be hidden while useful work is being performed. However, traditionally, load and store instructions have not been executed out of order because of the very nature of their purpose. For example, if a store instruction is scheduled to be executed in program order prior to a load instruction, but the processor executes these two instructions out of order so that the load instruction is executed prior to the store instruction, and these two instructions are referring to the same memory space, there is a likelihood that the load instruction will load incorrect, or old, data since the store instruction was not permitted to complete prior to the load instruction.

Nevertheless, the present invention takes advantage of the foregoing situation to increase the throughput of instructions.

SUMMARY OF THE INVENTION

The present invention increases the throughput of instructions by executing load instructions early in order to hide the latency of the memory subsystem. To ensure that the load instruction receives the correct data, the load address and size are compared to any older store instructions that may have occurred which have not been written to the cache/memory subsystem. Additionally, when a load hit store condition occurs, if the store data is known, it is determined whether this data can be forwarded to the load instruction even if the data has not yet been committed to memory.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
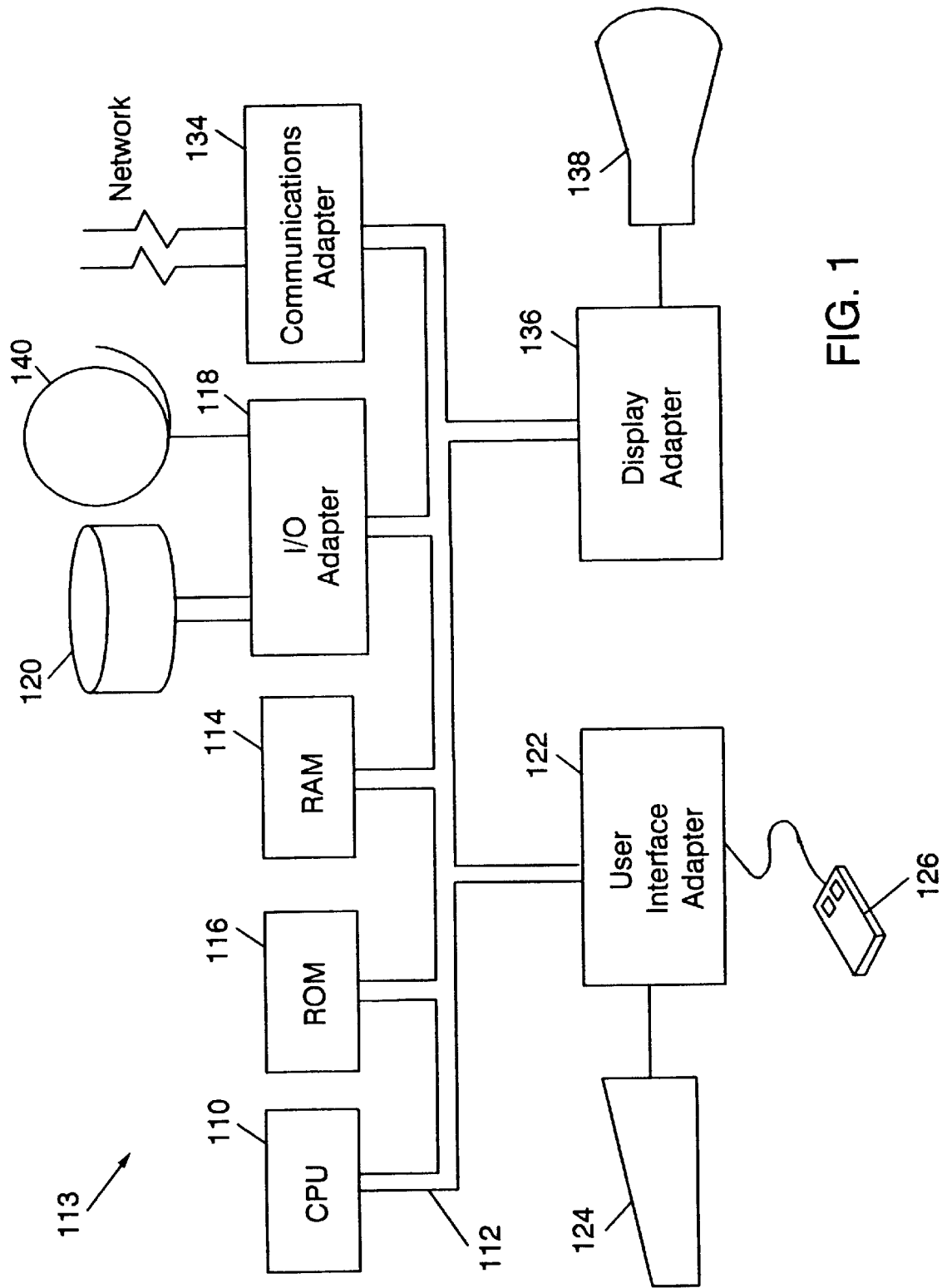
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of workstation 113 in accordance with the subject invention having central processing unit (CPU) 110, and a number of other units interconnected via system bus 112. CPU 110 embodies the load/store unit 201 of the present invention as described below. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting workstation 113 to a data processing network, and display adapter 136 for connecting bus 112 to display device 138. CPU 110 may include other circuitry (other than load/store unit 201) not shown herein, which will include circuitry commonly found within a microprocessor, e.g., execution unit, bus interface unit, arithmetic logic unit, etc. CPU 110 may also reside on a single integrated circuit.

Figures 2, 2A, 2B:
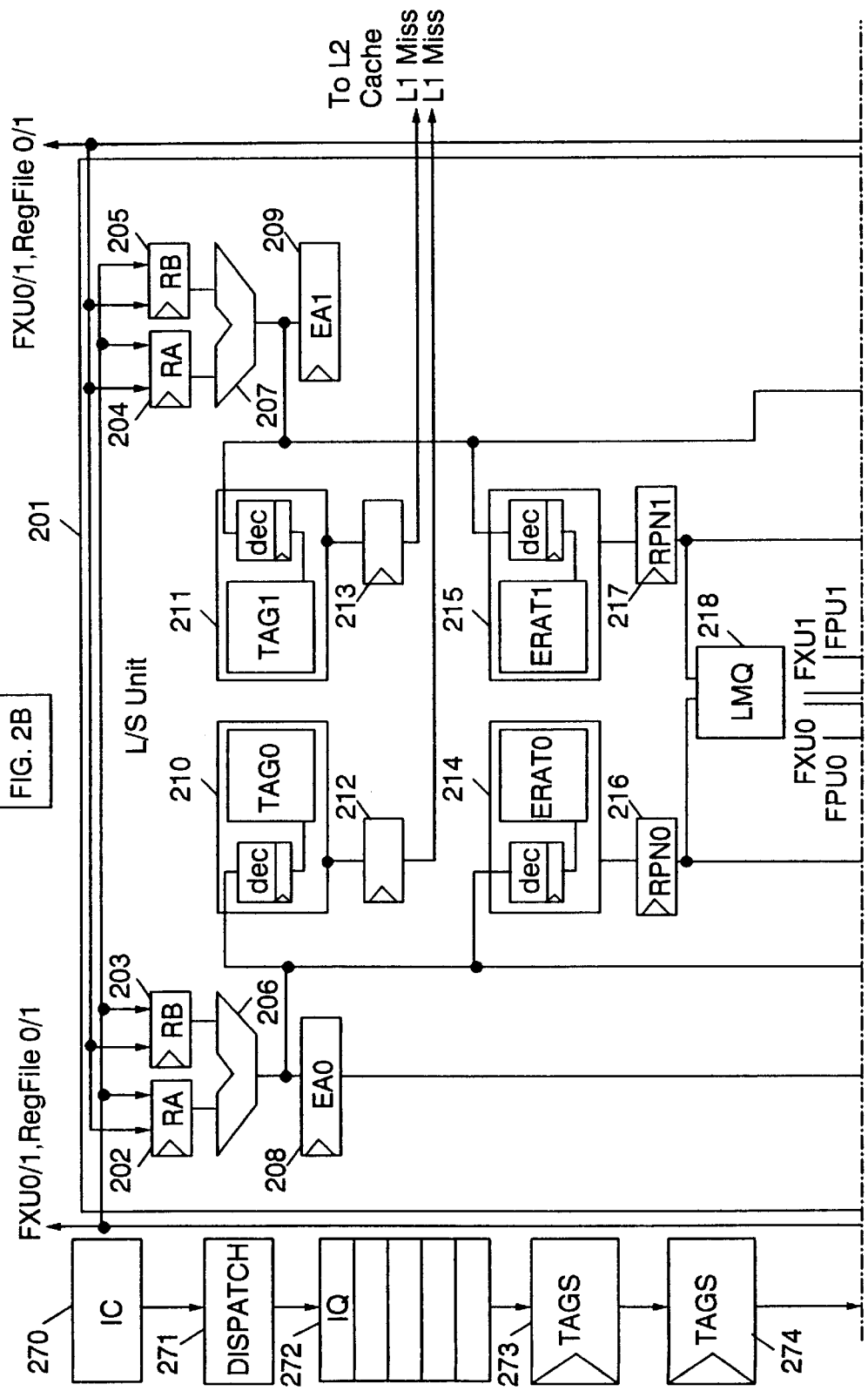
FIG. 2 (FIGS. 2A and 2B) illustrates a load/store unit configured in accordance with the present invention.
Figure 2B:
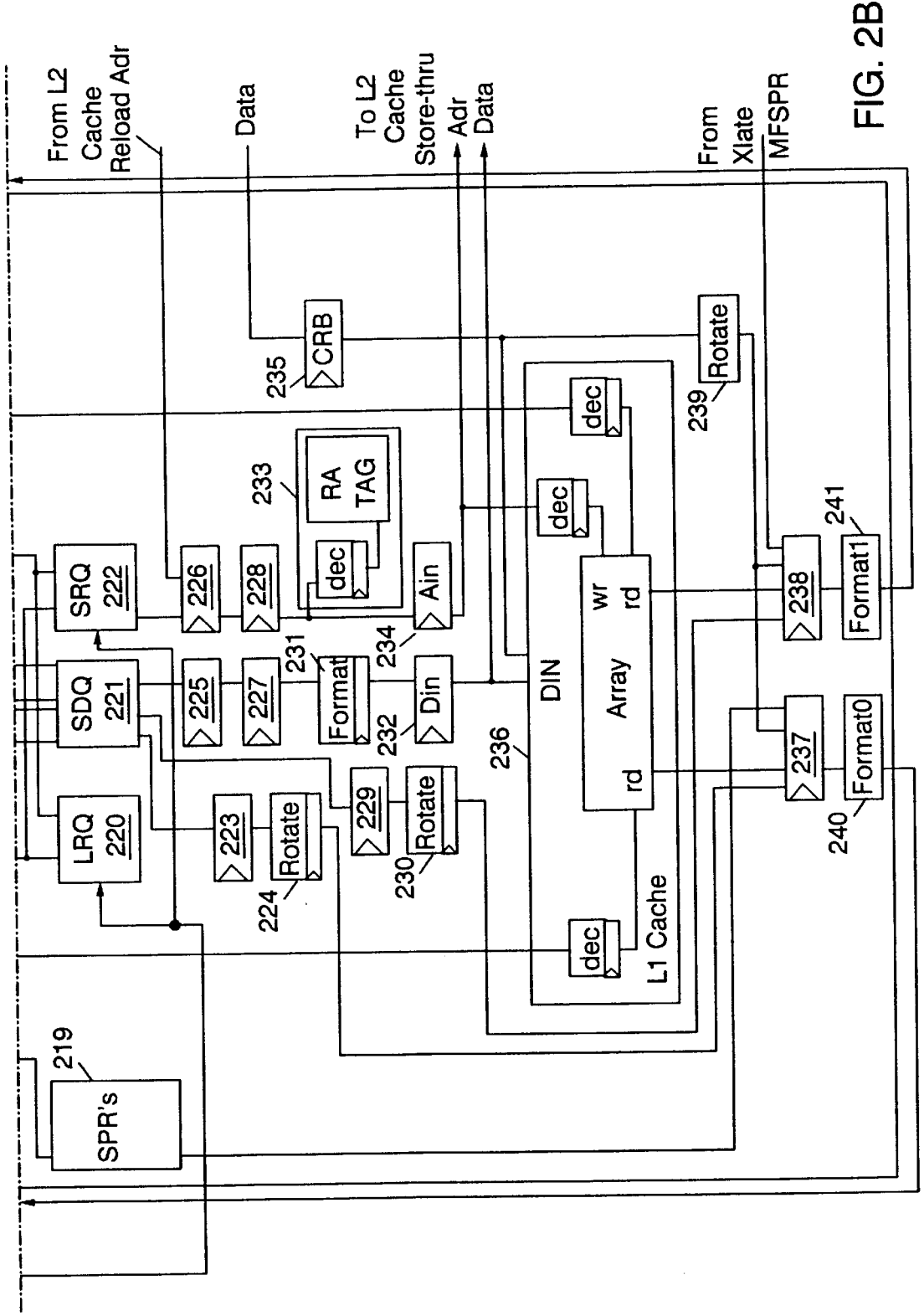

FIG. 2 (FIGS. 2A and 2B) illustrates load/store (L/S) unit 201 configured in accordance with the present invention. L/S unit 201 is located within CPU 110, which may be configured in accordance with typical microprocessor architectures.

L/S unit 201 has two pipelines so that two load or store instructions can be issued per machine cycle. Registers 202–205 receive instructions from fixed point units (FXUs) 0 and 1 (not shown) in a manner well-known in the art. 64-bit adder 206 adds operands received from registers 202 and 203, while 64-bit adder 207 adds operands from registers 204 and 205 to produces a pair of 64-bit effective addresses. These effective addresses are outputted to registers 208 and 209, respectively. Registers 208 and 209 capture the effective addresses (EA). They then both feed LMQ 218, LRQ 220 and SRQ 222, which all need a portion of the EA in addition to the real address from registers 216 and 217 to perform address checking. Additionally, the effective addresses are decoded to access tag arrays 210 and 211 to determine if there is a hit or a miss within L1 cache 236. If there is a miss, then the addresses are passed through registers 212 and 213 and sent to the L2 cache (not shown).

Furthermore, the effective addresses are sent from adders 206 and 207 to be decoded and to access the effective real address translator (ERAT) arrays 214 and 215, respectively, which output translated addresses through registers 216 and 217.

Further, the effective addresses from adders 206 and 207 access the L1 cache 236 for the load operation after being decoded by the decoders within the L1 cache 236. If there is a hit in the L1 cache 236, then the data is read out of the L1 cache 236 into registers 237, 238, and formatted by formatters 240, 241, and returned on the result bus to be sent to a register file (RegFile) (not shown). The cache line read out of L1 cache 236 is also returned into the registers 202–205 for operations that are dependent on the result as an operand.

Essentially, the three cycles performed within L/S unit 201 are the execute cycle (where the addition is performed), the access cycle (where access to the arrays is performed), and the result cycle (where the formatting and forwarding of data is performed).

If there is a miss in the cache, the request is then sent down to the L2 cache (not shown). The load miss queue (LMQ) 218 waits for the load data to come back from the L2 cache (not shown). The data associated with that cache line is loaded into the L1 cache 236.

These load operations can be performed speculatively and out of order. Store instructions are also executed out of order. Store instructions are divided into store address and store data instructions. The individual instructions are executed as soon as their operands are available and an execution unit is available to execute them. Store address instructions are translated and put in the store reorder queue (SRQ) 222. Store data instructions read the FXU or FPU register file and send the result to be written in the store data queue (SDQ) 221 to wait their turn to write to the L1 cache 236. Therefore, store instructions are executed out of order, but written into the L1 cache 236 in order.

The SRQ 222 keeps track of store instructions that have been executed. SRQ 222 maintains the store instructions in the queue and determines when the data is available in the SDQ 221 and when the store instruction is next to complete. The store to the L1 cache 236 is then completed.

Many of the registers 223, 225–229, and 237–238, are utilized for timing.

Cache lines within the L1 cache 236 are accessed based on the effective address of the cache line. The RA tag array 233 keeps track of where in the L1 cache 236 a cache line was written. The format block 231 takes the data from the SDQ 221 and rotates it properly to write into the correct byte positions in the L1 cache 236 upon execution of the store instruction.

Rotate blocks 224 and 230 are utilized for store forwarding. Therefore, if there is a store instruction that is sitting in the store queue and has not been written into the cache/ memory subsystem yet because it is not next to complete, and then a younger load instruction is received that needs that data, the data will be forwarded to the load instruction being executed (see FIG. 4). To simplify store forwarding, and store writes, when data is transferred to the SDQ 221, the data is rearranged so that the data corresponding to the location in memory of the store address is written into the first byte of the SDQ 221 entry, the store address +1 into the second byte, etc. The data is arranged in the order written to memory, but is byte-aligned. When the data is written to the L1 cache 236, it is rotated (blocks 224 and 230) so that the data is double-word aligned.

Rotate block 239 is utilized to rotate data received from the L2 cache (not shown) in response to an L1 cache miss, for forwarding the data from the L2 cache on to the result bus for forwarding to the proper register file.

Block 219 contains a number of special purpose registers to store data as a result of special purpose register instructions and read data from these registers so they get into the normal pipeline.

Register 235 is implemented for timing purposes to stage data from the L2 cache (not shown). Format blocks 240 and 241 format (or shift) cache data into the proper byte positions for the load result to the register file.

Figure 3:
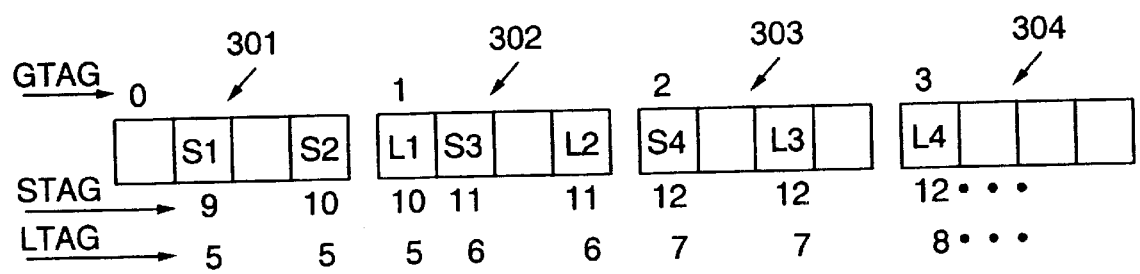
FIG. 3 illustrates a tagging method utilized by the load/store unit.

Referring next to FIG. 3, there is illustrated a diagram of a method for assigning tags to load and store instructions. Instructions are received from the instruction cache 270 by the instruction dispatch unit 271, which assigns tags to the load and store instructions as described herein. The instructions are then temporarily stored in the instruction queue 272. Tags 273 and 274 are pipeline registers used for timing purposes. 16 instructions in blocks of 4 (blocks 301–304) are analyzed at a time for the load/store tagging method of the present invention. Each block 301–304 is assigned a group tag (GTAG). Each store instruction is assigned an STAG and an LTAG. The STAG is incremented by a preceding store instruction (in program order), and the LTAG is incremented by preceding load instructions.

For example, the program order of the store instructions are S1, S2, S3, and S4. Store instruction S1 has an STAG of 9. The next store instruction S2 is then assigned an STAG of 10. The next store instruction S3 has an STAG of 11, and then the STAG is incremented to a 12 for the next store instruction S4. The load instructions L1, L2, L3, and L4 (in program order) are assigned the STAGs of the previous store instruction. Therefore, load instruction L1 receives an STAG of 10, which is the same STAG as the preceding store instruction S2. Load instruction L2 receives an STAG of 11, which is the same STAG as the preceding store instruction S3. Load instruction L3 receives an STAG of 12, which is the same STAG as the preceding store instruction S4. Load instruction L4 also receives an STAG of 12, since the STAG that immediately precedes the load instruction L4 is still the store instruction S4 having an STAG of 12.

The LTAGs for the store instructions are incremented based on the LTAG of a preceding load instruction. As a result, the LTAG for store instruction S3 is incremented to 6 because the LTAG for the preceding load instruction L1 is 5. The LTAGs are not incremented until the next store instruction S4 which is assigned an LTAG of 7 based on the previous LTAG of 6 for the load instruction L2. LTAGs are also incremented by a preceding load instruction. Therefore, the LTAG for load instruction L4 is assigned an 8 because the LTAG for the preceding load instruction L3 is a 7.

Figure 4:
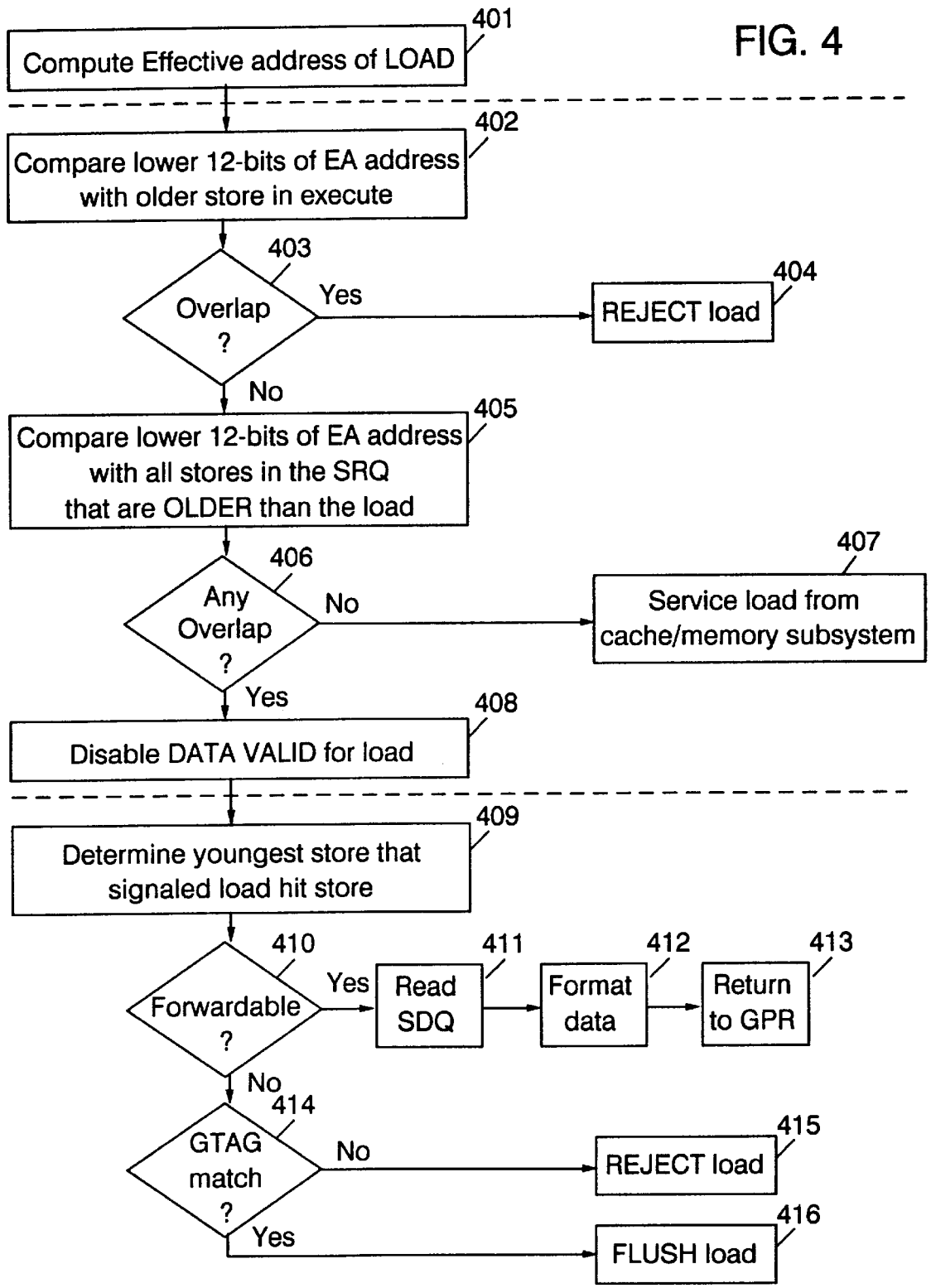
FIG. 4 illustrates a flow diagram for store forwarding in accordance with the present invention.

Referring next to FIG. 4, there is illustrated a flow diagram for store forwarding in accordance with the present invention. The first dashed line between steps 401 and 402 delineates the execute cycle discussed above from the access cycle. Step 401 is performed during the execute cycle, while steps 402–408 are performed during the access cycle. The second dashed line between steps 408 and 409 delineates the access cycle from the result cycle. Steps 409–416 are performed during the result cycle. In order to not affect normal load timing, a load hit store is detected during the access cycle to prevent the L1 cache 236 from servicing the load miss. However, the information available at the beginning of the cycle is the effective address of the load instruction. Therefore, load hit store is predicted based off an overlap compare of the lower twelve bits of the effective address, since the lower twelve bits are not translated to a different value.

In step 401, the effective address of a load instruction is computed by adders 206, 207. Thereafter, in step 402, the lower twelve bits of the effective address are compared with an older store instruction in execute. If there is an overlap (step 403), then the load instruction is rejected in step 404. If a load and store instruction simultaneously are in execute, the store instruction is older than the load instruction, and the effective address overlaps, then the load instruction is rejected, since the store instruction may write to the same location as the load instruction, and the load instruction will obtain old data from the cache before the store instruction will be able to write to L1 cache. Being able to reject the load instruction in step 404, instead of flushing the load instruction results in a less severe performance penalty.

If there is no overlap in step 403, then the process proceeds to step 405 to compare the lower twelve bits of the effective address (EA) with all store instructions in the SRQ 222 that are older than the load instruction. Please note that this is possible as a result of the LTAGs and the STAGs described above. Please also remember that the effective addresses in registers 208 and 209 are used for such a comparison with entries in the SRQ 222. In step 406, if there is not any overlap as a result of the comparison, then the load instruction will be serviced as normal from the cache/memory subsystem (step 407). However, if there is an overlap of the lower twelve bits of the effective address between the store instruction in the SRQ 222 and the load instruction, then in step 408, the DATA VALID will be disabled for the load instruction. The lack of a DATA VALID means that the L1 cache 236 is unable to supply the correct data to the load instruction. In step 409, a determination is made of which is the youngest store instruction in the SRQ 222 that matches with the load instruction. In step 410, a determination is made whether this store instruction is forwardable. In other words, the SDQ 221 contains the store data and the load instruction is contained within the store instruction, meaning all of the bytes accessed from memory within the load instruction are contained by the store instruction. If yes, then this data is read in step 411 from the SDQ 221. The data is formatted as discussed above through rotation blocks 224, 230, and format blocks 240, 241. The data is then returned on one of the two result busses in step 413 to the GPR (General Purpose Register) requiring the load data.

In step 410, if the data is not resident within the SDQ 221, then in step 414, a determination is made whether there is a match of the GTAG between the load instruction and the store instruction. If the load and store instructions are in the same instruction group (a GTAG match), then the load instruction is flushed in step 416 to prevent a deadlock, because the store instruction will not ever be allowed to complete until the load instruction completes. When the group of instructions contained in the load and store instruction is flushed, the load and store instructions are placed in different instruction groups by the instruction issue logic upon being re-fetched.

If the load and store instructions are not within the same instruction group, then in step 415, the load instruction is rejected.

Although the present invention and its advantages have been described in detail, it should be understood that various changes, substitutions and alterations can be made herein without departing from the spirit and scope of the invention as defined by the appended claims.

What is claimed is:

1. In a processor, a method comprising the steps of:
   issuing a load instruction to a load/store unit for execution, wherein the load instruction is assigned to an instruction group;
   comparing a memory address location of data to be loaded by the load instruction with memory address locations in a store reorder queue of data to be stored by older and previously executed store instructions;
   if there is a match of the memory address location of data to be loaded by the load instruction with one or more of the memory address locations in the store reorder queue of data to be stored by older and previously executed store instructions, then forwarding the data to be stored to a register designated by the load instruction;
   wherein if the data is not forwardable to the load instruction, then determining if the load instruction and the store instruction are in the instruction group; and
   if the load instruction and the store instruction are in the instruction group, then flushing the load instruction; and
   if the load instruction and the store instruction are not in the instruction group, then rejecting the load instruction.

2. The method as recited in claim 1, wherein the forwarding step forwards the data corresponding to a youngest one of the one or more store instructions.

3. The method as recited in claim 1, wherein if there is not a match of the memory address location of data to be loaded by the load instruction with any memory address locations in the store reorder queue of data to be stored by older and previously executed store instructions, then the load instruction is provided with the data from the cache/memory subsystem.

4. The method as recited in claim 1, further comprising the steps of:
   before the step of comparing a memory address location of data to be loaded by the load instruction with memory address locations in a store reorder queue of data to be stored by older and previously executed store instructions, comparing the memory address location of the data to be loaded by the load instruction with memory address locations of older store instructions in execute; and
   rejecting the load instruction if there is a match of the memory address location of the data to be loaded by the load instruction with any memory address locations of older store instructions in execute.

5. A processor comprising:
   a load/store unit;
   a store reorder queue resident in the load/store unit;
   a dispatch unit for issuing a load instruction to the load/store unit for execution, wherein the load instruction is assigned to an instruct group;

circuitry for comparing a memory address location of data to be loaded by the load instruction with memory address locations in the store reorder queue of data to be stored by older and previously executed store instructions;

circuitry for forwarding the data to be stored to a register designated by the load instruction if there is a match of the memory address location of data to be loaded by the load instruction with one or more of the memory address locations in the store reorder queue;

wherein if the data is not forwardable to the load instruction, circuitry for determining if the load instruction and the store instruction are in the instruction group;

if the load instruction and the store instruction are in the instruction group, circuitry for flushing the load instruction; and if the load instruction and the store instruction are not in the instruction group, circuitry for rejecting the load instruction.

6. The processor as recited in claim 5, wherein the forwarding circuitry forwards the data corresponding to a youngest one of the one or more store instructions.

7. The processor as recited in claim 5, wherein if there is not a match of the memory address location of data to be loaded by the load instruction with any memory address locations in the store reorder queue of data to be stored by older and previously executed store instructions, then the load instruction is provided with the data from a cache/memory subsystem.

8. The processor as recited in claim 5, further comprising:

before comparing the memory address location of data to be loaded by the load instruction with memory address locations in a store reorder queue of data to be stored by older and previously executed store instructions, circuitry for comparing the memory address location of the data to be loaded by the load instruction with memory address locations of older store instructions in execute; and circuitry for rejecting the load instruction if there is a match of the memory address location of the data to be loaded by the load instruction with any memory address locations of older store instructions in execute.

9. In a processor, a method for store forwarding comprising the steps of:

issuing a load instruction to a load/store unit for execution, wherein the load instruction is assigned to an instruction group;

comparing an effective memory address location of data to be loaded by the load instruction with effective memory address locations of older store instructions in execute;

rejecting the load instruction if there is a match of the effective address location of the data to be loaded by the load instruction with any effective memory address locations of older store instructions in execute;

comparing a memory address location of data to be loaded by the load instruction with memory address locations in a store reorder queue of data to be stored by older and previously executed store instructions;

if the load instruction is contained within an older and previously executed store instruction, then forwarding the data to be stored to a register designated by the load instruction, wherein the forwarding step forwards the data corresponding to a youngest one of the one or more store instructions, wherein if there is not a match of the memory address location of data to be loaded by the load instruction with any memory address locations in the store reorder queue of data to be stored by older and previously executed store instructions, then the load instruction is provided with the data from the cache/memory subsystem;

wherein if the data is not forwardable to the load instruction, then determining if the load instruction and the store instruction are in the instruction group;

if the load instruction and the store instruction are in the instruction group, then flushing the load instruction; and if the load instruction and the store instruction are not in the instruction group, then rejecting the load instruction.

* * * * *

UNITED STATES PATENT AND TRADEMARK OFFICE
CERTIFICATE OF CORRECTION

PATENT NO. : 6,349,382 B1
DATED : February 19, 2002
INVENTOR(S) : Kurt Alan Feiste, Bruce Joseph Ronchetti and David James Shippy It is certified that error appears in the above-identified patent and that said Letters Patent is hereby corrected as shown below:

<u>Column 6,</u>
Line 12, after "method" insert -- for store forwarding --.
Line 67, replace "instruct" with -- instruction --.

Signed and Sealed this

Second Day of July, 2002

*Attest:*

*Attesting Officer*

JAMES E. ROGAN
*Director of the United States Patent and Trademark Office*